US006082909A

United States Patent [19]

Fitterman et al.

[11] Patent Number: 6,082,909

[45] Date of Patent: Jul. 4, 2000

[54] MANUALLY ACTUATED DISPENSERS AND KIT FOR ROOMLIGHT PROCESSING OF BLACK-AND-WHITE PHOTOGRAPHIC ELEMENTS

[75] Inventors: Alan S. Fitterman, Rochester; Robert E. Dickerson, Hamlin; Peter J. Kelch, Rochester; Ronald J. Perry, Webster; David G. Sherburne, Ontario; James T. Samuels, Rochester, all of N.Y.

[73] Assignee: Eastman Kodak Company, Rochester, N.Y.

[21] Appl. No.: 09/092,726

[22] Filed: Jun. 5, 1998

Related U.S. Application Data

[63] Continuation-in-part of application No. 08/970,869, Nov. 14, 1997, Pat. No. 5,871,890.

[51] Int. Cl.[7] .......... C03D 3/02

[52] U.S. Cl. .......... 396/626; 396/636

[58] Field of Search .......... 396/636, 641, 396/626, 627, 598; 378/168, 183; 206/455; 355/27

[56] References Cited

U.S. PATENT DOCUMENTS

| | | | |
|---|---|---|---|
| 3,630,744 | 12/1971 | Thiers et al. | 430/602 |
| 4,518,240 | 5/1985 | Taylor et al. | 396/626 |
| 4,518,684 | 5/1985 | Martin | 430/403 |
| 4,803,150 | 2/1989 | Dickerson et al. | 430/502 |
| 5,274,691 | 12/1993 | Neri | 378/183 |
| 5,370,977 | 12/1994 | Zietlow | 430/502 |
| 5,956,539 | 9/1999 | Fitterman et al. | 396/636 |

*Primary Examiner*—D. Rutledge
*Attorney, Agent, or Firm*—William F. Noval

[57] ABSTRACT

Black-and-white elements, such as radiographic films, can be processed in roomlight because they include certain light absorbing dyes and desensitizers. Processing of such elements can be achieved using a processing kit and a two-stage process carried out in the same light- and fluid-tight processing apparatus. In the first stage, development is initiated with a developing composition having a pH of from about 10 to about 12.5, and comprising an appropriate black-and-white developing agent and a sulfite. After an appropriate time, a non-sulfite fixing agent is introduced into the processing apparatus or container to provide a combined developing/fixing composition, and development and fixing are carried out simultaneously. The processing method is carried out quickly, usually within about 90 seconds. The presence of sulfite and high pH in both stages decolorizes or deactivates the particulate dyes. The processing kit includes the photographic element, a first vessel containing a developing composition, a second vessel containing a fixing composition, and a container for holding an exposed element. The first and second vessels have manually actuated dispensers for dispensing developing composition and fixing composition into the container for processing of the exposed element.

24 Claims, 4 Drawing Sheets

MANUALLY ACTUATED DISPENSERS AND KIT FOR ROOMLIGHT PROCESSING OF BLACK-AND-WHITE PHOTOGRAPHIC ELEMENTS

CROSS REFERENCE TO RELATED APPLICATIONS

This continuation-in-part patent application claims the benefit under 35 USC § 120 of the earlier filing date of copending and commonly assigned U.S. Ser. No. 08/970,869, filed on Nov. 14, 1997, now U.S. Pat. No. 5,871,890 by Fitterman, et al.

FIELD OF THE INVENTION

This invention relates in general to photography and in particular to a kit for photochemical processing of black-and-white photographic elements. More particularly, it relates to a kit for roomlight processing of radiographic films, such as dental films, using a two-stage development and development/fixing sequence of steps. The developer and fixer are contained in vessels having manually actuated dispensers.

BACKGROUND OF THE INVENTION

Roentgen discovered X-radiation by the inadvertent exposure of a silver halide photographic element. In 1913, Eastman Kodak Company introduced its first product specifically intended to be exposed by X-radiation (X-rays). Silver halide radiographic films account for the overwhelming majority of medical diagnostic images. It was recognized almost immediately that the high energy ionizing X-rays are potentially harmful, and ways were sought to avoid high levels of patient exposure. Radiographic films provide viewable silver images upon imagewise exposure followed by rapid access processing.

One approach, still in wide-spread use is to coat the silver halide emulsions useful in radiographic films on both sides of the film support. Thus, the number of X-rays that can be absorbed and used for imaging are doubled, providing higher sensitivity. Dual-coated radiographic films are sold by Eastman Kodak Company as DUPLITIZED films. Films that rely entirely upon X-radiation absorption for image capture are referred to in the art as "direct" radiographic films while those that rely on intensifying screen light emission are referred to as "indirect" radiographic films. Because the silver halide emulsions are used to capture the X-rays directly, the coating coverages of such emulsions are generally higher than in other radiographic elements. A typical coverage is about 5 g of silver/$m^2$ per side of DUPLITIZED films, and twice that amount for single-side coated films.

Other radiographic films are considered "indirect" because they are used in combination with phosphor-containing X-ray intensifying screens that absorb the X-rays, and then emit light that exposes the silver halide grains in the emulsion layers.

In addition to the two broad categories noted above, there is a third category of radiographic films, most commonly used for dental intra-oral diagnostic imaging and hereafter referred to as "dental films". Intra-oral dental imaging presents obvious barriers to the use of intensifying screens. Thus, dental films utilize the coated silver halide to absorb X-rays, and are therefore a form of "direct" radiographic films.

There are other applications for direct radiographic films, such as in various industrial applications where X-rays are captured in imaging, but intensifying screens cannot be used for some reason.

U.S. Pat. No. 5,370,977 (Zietlow) describes dental films having improved characteristics and containing certain tabular grain silver halide emulsions. No spectral sensitization is used in such dental films, but in order to avoid fogging the films with inadvertent light exposure, the emulsions contain what is identified as a "desensitizer" that reduces emulsion sensitivity to light. Conventional processing solutions and conditions are described for these dental films.

Other desensitizing compounds for radiographic films are described in U.S. Pat. No. 3,630,744 (Thiers et al) for reducing film sensitivity to roomlight and UV radiation. Conventional processing of these films is also described.

It is the prevailing practice to process direct radiographic films for more than 3 minutes because of higher silver coverage. Such processes typically include black-and-white development, fixing, washing and drying. Films processed in this manner are then ready for viewing.

Photographic developing solutions containing a silver halide developing agent are well known in the photographic art for reducing silver halide grains containing a latent image to yield a developed photographic image. Many useful developing agents are known in the art, with hydroquinone and similar dihydroxybenzene compounds and ascorbic acid (and derivatives) being some of the most common. Such solutions generally contain other components such as sulfites as antioxidants, buffers, antifoggants, halides and hardeners. A workable pH for such solutions is usually in the range of from about 10 to about 11, depending upon the developing agent and other solution components.

Fixing solutions for radiographic films are also well known and include one or more fixing agents, of which thiosulfates are most common. Such solutions also generally include sulfites as antioxidants, and hardeners (such as aluminum salts), and a buffer (such as acetate), and have a functional pH range of from about 4 to about 5.5.

"Monobath" solutions are also known in the art of photographic chemical processing. Such solutions generally require long processing times and contain chemical components common to black-and-white developing and fixing solutions. They also typically have an alkaline pH and contain a sulfite.

Double-coated indirect radiographic elements described in U.S. Pat. No. 4,803,150 (Dickerson et al) contain certain microcrystalline particulate dyes that reduce "crossover". These elements are designed for use with intensifying screens. Crossover occurs when some light emitted by the screen passes through the film support and exposes silver halide grains on the opposite side, resulting in reduced image sharpness. The noted particulate dyes absorb unwanted actinic radiation, but are decolorized during conventional processing. Thus, a pH 10 developing solution is described for its conventional use as well as to decolorize the dyes within 90 seconds. Conventional fixing and washing follow.

Using conventional processing technology, such particulate dyes that allow roomlight handling would be rendered ineffective, since the development step is carried out at high pH in the presence of a sulfite. Thus, in a conventional multi-step process, the processed films cannot be handled in roomlight between the developing and fixing steps. Conventional "monobath" solutions do not allow for sufficient development since both exposed and unexposed silver halide is indiscriminately removed by the fixing agents, especially at the long processing times employed with these solutions.

Direct radiographic films, including dental films, thus have some sensitivity to roomlight and UV as well as X-rays, and therefore care must be taken to avoid inadvertent room-light exposure before and during processing. There has been a desire for radiographic films that are less sensitive to roomlight, and that can be handled and processed without the need for a darkroom or other special conditions. Such films would have a number of useful applications, such as dental and industrial imaging. However, conventional processing solutions and methods cannot be used to provide suitable radiographic images in such films.

It has been proposed to use separate developing and fixing compositions for processing roomlight handleable films, including radiographic dental films in sequential processing steps. While those compositions represent an advance in the art, they must be separately balanced in pH in relation to each other so that the light protecting dyes and desensitizers are not deactivated prematurely.

Using current processing technology, the dyes that allow roomlight handling would be rendered ineffective, since the development step is carried out at a high pH in the presence of sulfite ions. Thus, in a conventional multi-step process, the films could be handled in roomlight between the development and fixing steps. Conventional monobath processing solutions do not allow for sufficient development, since exposed and unexposed silver halide is indiscriminately removed by fixing agents, especially at the long processing times employed using those solutions.

Several methods are known for processing small format films, such as dental radiographs. One method uses an expensive automatic film processor which requires a source of AC power, water, and drains. Another method uses hand processing with trays of chemistry in a darkroom area. Other methods of developing film without an automatic processor or darkroom are also known. Thus, U.S. Pat. No. 5,274,691, issued Dec. 28, 1993, inventor Neri discloses an integral unit containing a dental radiographic plate in one compartment and processing liquid in another compartment. After the dental radiographic plate is exposed, a seal is broken between the compartments to flow the processing liquid into the dental plate compartment. U.S. Pat. No. 4,518,864, issued May 21, 1985, inventor Martin, discloses a pouch containing a dental x-ray film into which processing fluids are injected by means of an injection needle, after the dental x-ray film is exposed. The latter two methods are inherently messy and often produce undesirable conditions for the personnel using them (e.g., accidentally injecting oneself with the injection needle of the latter patent).

There is thus a need for a simple, inexpensive, and easy to use kit for processing room light loading dental x-ray film.

SUMMARY OF THE INVENTION

The present invention provides a processing kit useful for processing dental or other black-and-white films in roomlight.

According to a feature of the present invention, a processing kit comprises: a black-and-white photographic silver halide element comprising a support having thereon one or more layers, at least one of the layers being a silver halide emulsion layer, the element further comprising: in one of the layers, a microcrystalline particulate dye that absorbs electromagnetic radiation in the visible and UV portions of the spectrum and is decolorized upon contact with a fixing agent other than a sulfite, and in each silver halide emulsion layer, a desensitizer that reduces sensitivity of the silver halide emulsion layer to electromagnetic radiation in the visible portion of the spectrum by trapping electrons generated by exposure to that electromagnetic radiation, a first vessel containing a black-and-white developing composition comprising from about 0.1 to about 0.5 mol/l of a black-and-white developing agent, and from about 0.25 to about 0.7 mol/l of a sulfite, and having a first manually actuated dispenser for dispensing said developing composition; a second vessel containing a fixing composition comprising from about 0.2 to about 4 mol/l of a fixing agent other than a sulfite, and having a second manually actuated dispenser for dispensing said fixing composition; and a container including a holder for holding at least one of said photographic elements after exposure and further including an inlet through which said first and second dispensers dispense developing and fixing compositions into contact with said exposed element to develop and fix said element.

According to another feature of the present invention, there is provided a processing kit comprising: a container including a holder for removably holding at least one exposed photographic element in the container and further including an inlet through which fluids are dispensed into the container; a first vessel containing developer fluid, having a first manually actuated dispenser for dispensing developer fluid through the inlet into the container; and a second vessel containing fixer fluid, having a second manually actuated dispenser for dispensing fixer fluid through the inlet into the container.

ADVANTAGEOUS EFFECT OF THE INVENTION

The invention has the following advantages.

1. Small format films, such as dental radiographs, can be processed in roomlight using a simple and low cost processing system.

2. Processing is carried out without a processor that requires a supply of AC power, water, and drains.

3. A dedicated darkroom area with processing components is not needed.

4. The processing system can be packaged in an aesthetically pleasing system.

DETAILED DESCRIPTION OF THE INVENTION

Figure 1:
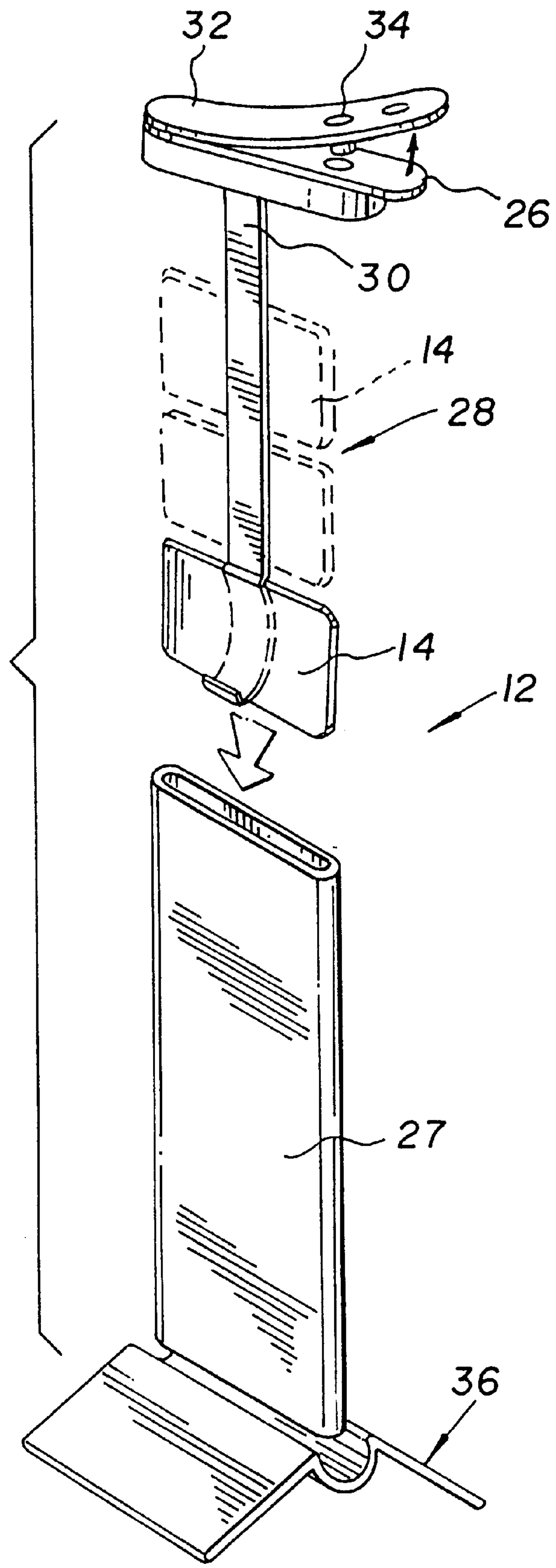
FIG. 1 is an exploded view of a photographic element container forming part of the present invention.

The processing kit of the present invention is useful for providing a black-and-white image in a photographic silver halide element, and preferably a radiographic film (more preferably a dental film). Other types of elements that can be included in the kit of the present invention include, but are not limited to, aerial films, black-and-white motion picture films, duplicating and copy films, and amateur and professional continuous tone black-and-white films. The compositions of such materials are well known in the art but the specific features that make them roomlight handleable are described below in more detail.

The present invention is a kit including components described herein needed for processing the photographic elements.

The first component is a black-and-white photographic silver halide element. This element can be of any suitable size, but typically for dental films, the elements are square or rectangular elements in what are known in the art as "chips" or dental packets. The kit can have any suitable number of such elements.

These elements are composed of a conventional flexible, transparent film support (polyester, cellulose acetate or polycarbonate) that has applied to at least one side, and preferably to both sides, one or more photographic silver halide emulsion layers. For radiographic films, it is conventional to use blue-tinted support materials to contribute to the blue-black image tone sought in fully processed films. Polyethylene terephthalate and polyethylene naphthalate are preferred film supports.

In general, such elements, emulsions, and layer compositions are described in many publications, including *Research Disclosure,* publication 36544, September 1994. *Research Disclosure* is a publication of Kenneth Mason Publications, Ltd., Dudley House, 12 North Street, Emsworth, Hampshire PO10 7DQ England. It is also available from Emsworth Design Inc., 121 West 19th Street, New York, N.Y. 10011. This reference will be referred to hereinafter as "*Research Disclosure*".

Preferred silver halide emulsions include silver bromide and silver bromoiodide (having up to 15 mol % silver iodide). Preferred silver halide emulsions include forehardened tabular grain emulsions as described, for example, in U.S. Pat. No. 4,414,304 (Dickerson et al). These emulsions typically have thin tabular grains of predominantly silver bromide and up to 15 mol % silver iodide, an average thickness of less than about 0.3 $\mu$m, and preferably, up to 3 mol % silver iodide and less than about 0.2 $\mu$m. The grains are usually dispersed in forehardened colloids, such as forehardened gelatin (using a conventional hardener). The emulsions also contain conventional addenda for providing desired coating and sensitometric properties, including but not limited to, sensitizing dyes, infrared opacifying dyes, stabilizers, antifoggants, antikinking agents, surfactants, latent-image stabilizers and other materials known in the art.

In some embodiments, the radiographic films processed as described herein can also include a thiaalkylene bis (quaternary ammonium) salt in at least one layer, to increase imaging speed by acting as development accelerators. Such elements are described in more detail in U.S. Pat. No. 5,652,086 (Brayer et al).

The silver halide emulsion and other layers in the elements contain conventional hydrophilic colloid vehicles (with or without peptizers or other binders), typically gelatin or gelatin derivatives. Various synthetic polymer peptizers or binders can also be used alone or in combination with gelatin or gelatin derivatives.

Each element has one or more silver halide emulsion layers on one or both sides of the support, and when there are emulsion layers on both sides of the support, those layers preferably have the same silver halide compositions. Thus, the silver halides in the layers can be the same or different. In one embodiment, the radiographic films have two silver halide emulsion layers on both sides of the support, with the layers closest to the support containing solely silver bromide grains. The silver coverages on each or both sides of the support can be the same or different. Generally, the total silver coverage on each side is at least about 5 g Ag/m$^2$, and preferably at least about 15 g Ag/m$^2$.

Each or both sides of the element can also include a protective overcoat, or only one side can have an overcoat layer, such a layer containing a hydrophilic colloid material and optionally any other addenda commonly (such as matting agents) used to modify the surface characteristics. The coating coverage of such layers is generally at 0.6 g/m$^2$ of protective colloid, such as a gelatin. Conventional subbing layers can also be included to adhere the silver halide emulsion layers to the support. Other layers, such as interlayers, may be present in the element for conventional purposes, such as providing adhesion. Preferred elements contain an overcoat layer on at least one side of the support.

The total thickness of the coated layers on either or both sides of the elements can be at least 3 $\mu$m, and preferably at least 4 $\mu$m. The thickness is generally less than 7 $\mu$m, and preferably less than 6 $\mu$m.

As noted above, these elements also contain one or more particulate dyes and/or one or more desensitizers to provide roomlight handleability. Such materials are thus useful if they absorb all incident electromagnetic radiation at from about 350 to about 550 nm.

Advantageously, the elements contain one or more particulate dyes described above that absorb electromagnetic radiation in the visible and UV regions of the spectrum. These dyes are usually placed in the overcoat layer(s), but they can be in more than one location as long as they are readily decomposed during fixing.

Such particulate dyes generally have a size to facilitate coating and rapid decolorization during processing. In general, the smaller particles are best for these purposes, that is those having a mean diameter of less than 10 $\mu$m, and preferably less than 1 $\mu$m. The particulate dyes are most conveniently formed by crystallization from solution in sizes ranging down to 0.01 $\mu$m or less. Conventional techniques can be used to prepare dyes of the desired size, including ball milling, roller milling and sand milling.

An important criterion is that such dyes remain in particulate form in hydrophilic colloid layers of photographic elements. Various hydrophilic colloids can be used, as would be appreciated by a skilled worker in the art, including those mentioned herein for various layers. Where the particulate dyes are placed in overcoat layers, the particulate dyes are generally the only component besides the binder material.

Classes of useful particulate dyes include, but are not limited to, nonionic classes of compounds such as nonionic polymethine dyes, which include the merocyanine, oxonol, hemioxonol, styryl and arylidene dyes. Anionic dyes of the cyanine class may also be useful as long as they have the desired coatability properties (soluble at pH 5 to 6 and 40° C.) and remain in particulate form after coating. Some useful particulate dyes are described, for example, in U.S. Pat. No. 4,803, 150 (Dickerson et al), incorporated herein by reference.

The useful amount of particulate dye in the elements is at least 0.5 g/m$^2$ on each side of the support, and preferably at least 0.7 g/m$^2$. Generally, the upper limit of such materials is 2 g/m$^2$, and preferably, less than 1.5 g/m$^2$ is used. Mixtures of particulate dyes can be used in one or more layers of the element.

The elements also include one or more "desensitizers" in a silver halide emulsion layer(s) in order to provide additional visible and UV light protection. Conventional desensitizers can be used, as are known in photography and radiography. Various desensitizers are described, for example, in Research Disclosure, Vol. 308, December 1989, publication 308119, Section III, the disclosure of which is incorporated herein by reference. Classes of such compounds include azomethine dyes (such as those described in U.S. Pat. No. 3,630,744 of Thiers et al).

Generally, the amount of desensitizer relative to the amount of silver halide in the element is adapted according to the particular silver halide emulsion used in the element, the particular desensitizer used, the ratio of gelatin or other colloid binder to silver halide, other components of the emulsions, and the procedure for preparing the emulsions. All of these factors would be well known to one skilled as a maker of silver halide emulsions. Thus, the amount should be effective to provide for a reduction in visible and UV light sensitivity, but no reduction in sensitivity to X-radiation.

More particularly, the useful amount of desensitizer in the elements is at least 1.5 $mg/m^2$ on each side of the support, and preferably at least 1.7 $mg/m^2$. Generally, the upper limit of such materials is 4 $mg/m^2$, and preferably, less than 3 $mg/m^2$ is used. Mixtures of desensitizers can be used in one or more layers of the element.

A second component that can be included in the processing kit of this invention is a black-and-white developing composition that contains one or more black-and-white developing agents, including dihydroxybenzene and derivatives thereof, and ascorbic acid and derivatives thereof. This composition is usually in liquid form, but can also be a solid composition.

Dihydroxybenzene and similar developing agents include hydroquinone and other derivatives readily apparent to those skilled in the art. Hydroquinone is preferred. Other developing agents of this type are described, for example, in U.S. Pat. No. 4,269,929 (Nothnagle).

Ascorbic acid developing agents are described in a considerable number of publications in photographic processes, including U.S. Pat. No. 5,236,816 (Purol et al) and references cited therein. Useful ascorbic acid developing agents include ascorbic acid and the analogues, isomers and derivatives thereof.

Such compounds include, but are not limited to, D- or L-ascorbic acid, sugar-type derivatives thereof (such as sorboascorbic acid, γ-lactoascorbic acid, 6-desoxy-L-ascorbic acid, L-rhamnoascorbic acid, imino-6-desoxy-L-ascorbic acid, glucoascorbic acid, facoascorbic acid, glucoheptoascorbic acid, maltoascorbic acid, L-arabosascorbic acid), sodium ascorbate, potassium ascorbate, isoascorbic acid (or L-erythroascorbic acid), and salts thereof (such as alkali metal, ammonium or others known in the art), endiol type ascorbic acid, an enaminol type ascorbic acid, a thioenol type ascorbic acid, and an enaminthiol type ascorbic acid, as described for example in U.S. Pat. No. 5,498,511 (Yamashita et al), EP-A-0 585,792 (published Mar. 9, 1994), EP-A-0 573 700 (published Dec. 15, 1993), EP-A-0 588 408 (published Mar. 23, 1994), WO 95/00881 (published Jan. 5, 1995), U.S. Pat. No. 5,089,819 and U.S. Pat. No. 5,278,035 (both of Knapp), U.S. Pat. No. 5,384,232 (Bishop et al), U.S. Pat. No. 5,376,510 (Parker et al), Japanese Kokai 7-56286 (published Mar. 3, 1995), U.S. Pat. No. 2,688,549 (James et al), U.S. Pat. No. 5,236,816 (noted above) and Research Disclosure, publication 37152, March 1995. D-, L-, or D,L-ascorbic acid (and alkali metal salts thereof) or isoascorbic acid (or alkali metal salts thereof) are preferred. Sodium ascorbate and sodium isoascorbate are most preferred. Mixtures of these developing agents can be used if desired.

The developing composition can also preferably include one or more auxiliary co-developing agents, which are also well known (e.g., Mason, *Photographic Processing Chemistry,* Focal Press, London, 1975). Any auxiliary developing agent can be used, but the 3-pyrazolidone developing agents are preferred (also known as "phenidone" type developing agents). Such compounds are described, for example, in U.S. Pat. No. 5,236,816 (noted above). The most commonly used compounds of this class are 1-phenyl-3-pyrazolidone, 1-phenyl-4,4-dimethyl-3-pyrazolidone, 4-hydroxymethyl-4-methyl- I -phenyl-3-pyrazolidone, 5-phenyl-3-pyrazolidone, I-p-aminophenyl-4,4-dimethyl-3-pyrazolidone, 1-p-tolyl-4,4-dimethyl-3-pyrazolidone, 1-p-tolyl-4 -hydroxymethyl-4-methyl-3-pyrazolidone, and 1-phenyl-4,4-dihydroxymethyl-3-pyrazolidone. Other useful co-developing agents comprise one or more solubilizing groups, such as sulfo, carboxy or hydroxy groups attached to aliphatic chains or aromatic rings, and preferably attached to the hydroxymethyl function of a pyrazolidone, as described for example, in commonly assigned and copending U.S. Ser. No. 08/694,792 filed Aug. 9, 1996, by Roussihle et al. A most preferred co-developing agent is 4-hydroxymethyl-4-methyl-1 -phenyl-3-pyrazolidone.

Less preferred auxiliary co-developing agents include aminophenols such asp-aminophenol, o-aminophenol, N-methylaminophenol, 2,4-diaminophenol hydrochloride, N-(4-hydroxyphenyl)glycine, p-benzylaminophenol hydrochloride, 2,4-diamino-6-methylphenol, 2,4-diaminoresorcinol and N-(beta-hydroxyethyl)-p-aminophenol.

A mixture of different types of auxiliary developing agents can also be used if desired.

An organic antifoggant is -also preferably in the developing composition, either singly or in admixture. Such compounds control the gross fog appearance in the processed elements. Suitable antifoggants include, but are not limited to, benzimidazoles, benzotriazoles, mercaptotetrazoles, indazoles and mercaptothiadiazoles. Representative antifoggants include 5-nitroindazole, 5-p-nitrobenzoylaminoimidazole, 1-methyl-5-nitroindazole, 6-nitroindazole, 3-methyl-5-nitroindazole, 5-nitrobenzimidazole, 2-isopropyl-5-nitrobenzimidazole, 5-nitrobenzotriazole, sodium 4-(2-mercapto-1,3,4-thiadiazol-2-yl-thio)butanesulfonate, 5-amino-1,3,4-thiadiazol-2-thiol, 5-methylbenzotriazole, benzotriazole and 1-phenyl-5-mercaptotetrazole. Benzotriazole is most preferred.

The developing composition also includes one or more sulfite preservatives or antioxidants. A "sulfite" preservative is used herein to mean any sulfur compound that is capable of forming or providing sulfite ions in aqueous alkaline solution. Examples include, but are not limited to, alkali metal sulfites, alkali metal bisulfites, alkali metal metabisulfites, amine sulfur dioxide complexes, sulfurous acid and carbonyl-bisulfite adducts. Mixtures of these materials can also be used. Examples of preferred sulfites include sodium sulfite, potassium sulfite, lithium sulfite, sodium bisulfite, potassium bisulfite, sodium metabisulfite, potassium metabisulfite and lithium metabisulfite. Useful carbonyl-bisulfite adductsinclude alkali metal or amine bisulfite adducts of aldehydes and bisulfite adducts of ketones, such as sodium formaldehyde bisulfite, sodium acetaldehyde bisulfite, succinaldehyde bis-sodium bisulfite, sodium acetone bisulfite, γ-methyl glutaraldehyde bis-sodium bisulfite, sodium butanone bisulfite, and 2,4-pentandione bis-sodium bisulfite.

Various known buffers, such as carbonates and phosphates, can be included in the developing composition, in liquid form, to maintain the desired pH to from about 10 to about 12.5, if desired. The pH of the aqueous developing composition is preferably from about 10.5 to about 12, and more preferably from about 11 to about 12. When the fixing composition is added in the second stage of processing (see below), the pH may drop slightly.

A third kit component is used in the second stage of the process. This component is a fixing composition comprising a fixing agent that is added to the developing composition to form a combined developing/fixing composition. While sulfite ion sometimes acts as a fixing agent, the fixing agents used in the second stage are different from sulfites. Useful fixing agents include thiosulfates (including sodium thiosulfate, ammonium thiosulfate, potassium thiosulfate and others readily known in the art), mercapto-substituted compounds (such as those described by Haist, *Modern Photographic Processing,* John Wiley & Sons, N.Y., 1979), thiocyanates (such as sodium thiocyanate, potassium thiocyanate, ammonium thiocyanate and other readily known in the art), and amines. Mixtures of one or more of these classes of fixing agents can be used if desired. Thiosulfates and thiocyanates are preferred. In a more preferred embodiment, a mixture of a thiocyanate (such as sodium thiocyanate) and a thiosulfate (such as sodium thiosulfate) is used. In such mixtures, the molar ratio of a thiosulfate to a thiocyanate is from about 1:1 to about 1:10, and preferably from about 1:1 to about 1:2. The sodium salt prefeg agents are preferred for environmental advantages.

The fixing composition can also include a sulfite antioxidant (as defined above), in an amount generally of at least 0.05 and preferably at least 0.07 mol/l, and generally less than 0.2 and preferably less than 0.15 mol/l.

This fixing composition generally has at least 0.5 and preferably at least 1 mol/l of the fixing agent. Generally, the fixing agent concentration is also less than 2, and preferably less than 1.5 mol/l. In liquid form, this composition is also buffered to a pH of from about 6 to about 9 with a suitable buffer such as a hydroxide. The fixing composition can also be provided in solid form.

Once the fixing agent is introduced into the processing apparatus, the combined developing/fixing composition then contains one or more black-and-white developing agents and sulfites, one or more fixing agents other than a sulfite, and preferably in addition, one or more co-developing agents, and one or more antifoggants, as described above. It is optional for the developing and/or fixing compositions to contain one or more sequestering agents that typically function to form stable complexes with free metal ions (such as silver ions) in solution. Many useful sequestering agents are known in the art, but particularly useful classes of compounds include, but are not limited to, multimeric carboxylic acids as described in U.S. Pat. No. 5,389,502 (Fitterman et al), aminopolycarboxylic acids, polyphosphate ligands, ketocarboxylic acids, and alkanolamines. Representative sequestering agents include ethylenediaminetetraacetic acid, diethylenetriaminepentaacetic acid, 1,3-propylenediaminetetraacetic acid, 1,3-diamino-2-propanoltetraacetic acid, ethylenediaminodisuccinic acid and ethylenediaminomonosuccinic acid.

Both developing and fixing compositions can also contain other additives including various development restrainers, development accelerators, fixing accelerators, swelling control agents and stabilizing agents, each in conventional amounts. Examples of such optional components are described in U.S. Pat. No. 5,236,816 (noted above), U.S. Pat. No. 5,474,879 (Fitterman et al), Japanese Kokai 7-56286 and EP-A-0 585 792.

The essential and preferred components are present in the developing composition (in aqueous form) in the general and preferred amounts listed in Table I, all amounts being approximate (that is, "about"). The amounts of each component in the combined developing/fixing composition after addition of the fixing composition are shown in the Table I in parentheses (). If formulated in dry form, the developing composition would have the essential components in amounts readily apparent to one skilled in the art suitable to provide the desired aqueous concentrations.

TABLE I

| Component | General Amount | Preferred Amount |
|---|---|---|
| Developing agent | 0.1 to 0.5 mol/l (0.09 to 0.3 mol/l) | 0.25 to 0.4 mol/l (0.12 to 0.25 mol/l) |
| Co-developing agent | 2 to 40 mmol/l (2 to 24 mmol/l) | 2 to 10 mmol/l (2 to 8 mmol/l) |
| Antifoggant | 0 to 2 mmol/l (0 to 0.5 mmol/l) | 0.1 to 1 mmol/l (0.1 to 0.5 mmol/l) |
| Sulfite antioxidant | 0.25 to 0.7 mol/l (0.1 to 0.4 mol/l) | 0.4 to 0.6 mol/l (0.2 to 0.4 mol/l) |
| Fixing agent(s) other than sulfite | 0 (0.2 to 4 mol/l) | 0 (1.5 to 3 mol/l) |

The developing and fixing compositions are prepared by dissolving the various components in water and adjusting the pH to the desired value using acids or buffers. The compositions can also be provided in concentrated form, and diluted to working strength just before use, or during use. After the first stage of development, the fixing agent(s) and any other components are dissolved in or added to the aqueous developing composition already in the processing container, in either aqueous or dry form.

Figure 2:
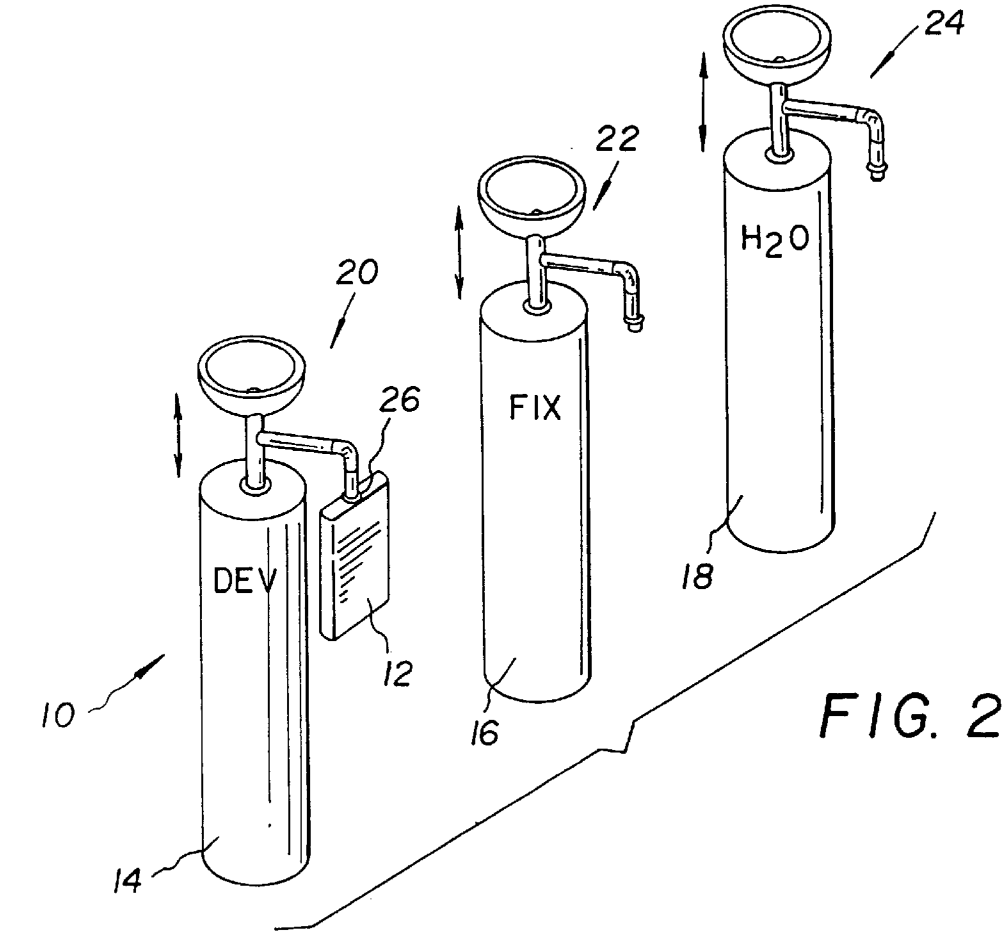
FIGS. 2 and 3 are perspective views of embodiments of the present invention.

Referring now to FIG. 2, there is shown an embodiment of the kit of the present invention. FIG. 2 shows processing kit 10 including a hand-held container 12 for holding and processing photographic elements, a first vessel 14 containing developer composition (fluid), a second vessel 16 containing fixer composition fluid, and, optionally, a third vessel 18 containing washing fluid ($H_2O$). Vessels 14,16,18 are respectively provided with manually actuated dispensers 20,22,24 for dispensing fluids into container 12 through inlet 26. Manually actuated dispensers 20,22,24 are of a known type for dispensing fluids from a vessel (such as from a hand lotion bottle).

FIG. 1 shows container 12 in greater detail as including a hollow body 27 and a removable member 28. Member 28 includes holder 30 for holding photographic elements 14 and a pliable cap 32 for sealing off body 27 when member 28 is inserted in body 27. Cap 32 includes inlet 26 and plug 34 for plugging inlet. Stand 36 is provided for container 12.

The proposed invention would be used chair side after the x-ray exam has been completed. The exposed dental film would be removed from its light tight package under room light conditions and placed into a small container 12. The container 12 would then be taken to a stationary fluid dispensing vessel 14 and filled with developing solution. The operator would then agitate the solution, either by hand or with a mechanical agitating device. At vessel 16, the fixing solution would then be added to the container 12 over the developer solution and fixing would begin. As a final step water would be added at vessel 18 either into the container or after the container was open to rinse away the processing solutions. The used solutions could be dumped down the drain or disposed of using a special recycling container. The x-ray film would then be viewed and dried. The drying step could be a simple line dry or a more complicated dryer requiring power (forced air, microwave, IR tubes, etc.)

Figure 3:
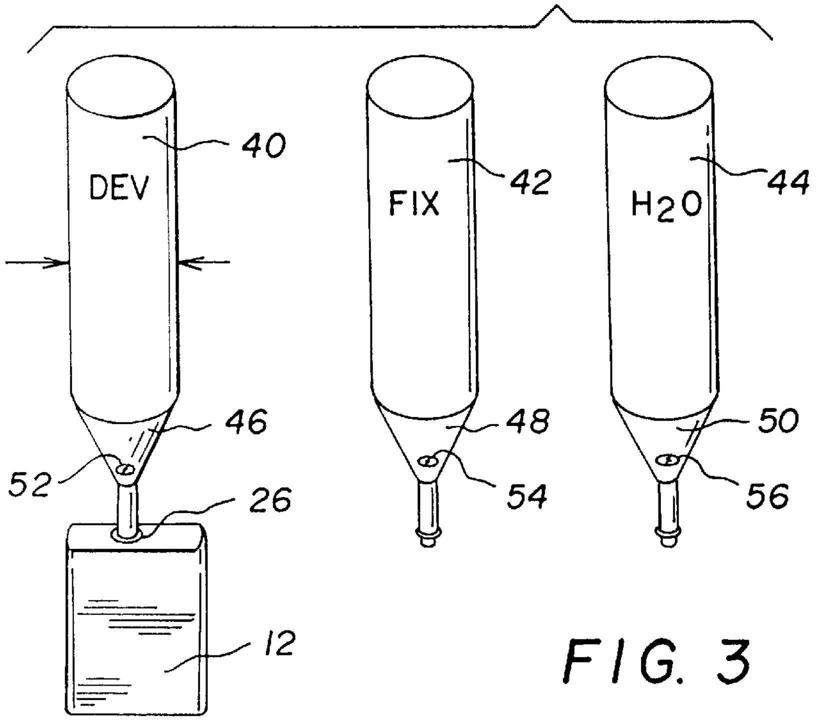

The kit shown in FIG. 3 includes resilient vessels 40,42,44 containing, respectively, developer, solution, fixer solution, and water. Vessels 40,42,44 have respective dispensing nozzles 46,48,50 located at the bottom thereof. Nozzles 46,48,50 have respective valves 52,54,56 which open when the vessel is squeezed to dispense fluid into container 12.

Figure 4:
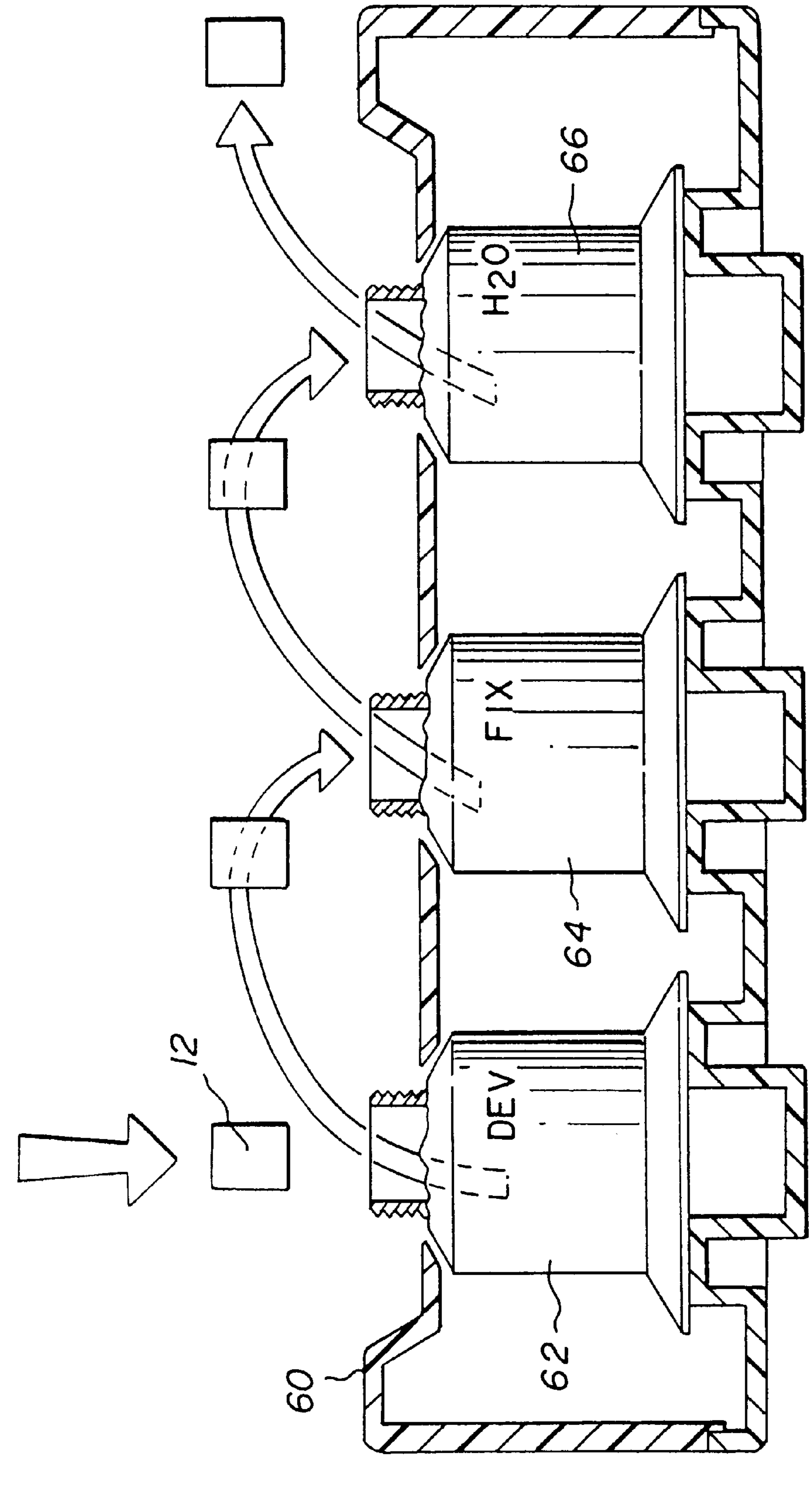
FIGS. 4–7 are perspective views of components which can form part of the present invention.
Figure 5:
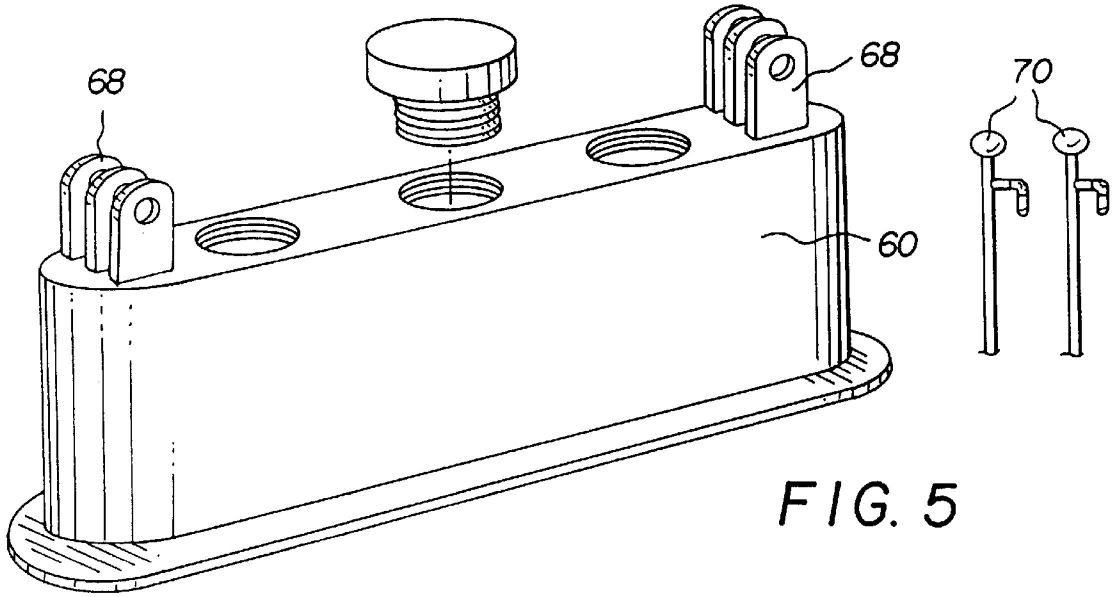

FIGS. 4 and 5 show package 60 for mounting vessels 62,64,66, respectively containing developer solution, fixer solution, and water in a single package. Package 60 can be table mounted or wall mounted by brackets 68. Dispensers 70 can be packaged separately and inserted into vessels 62,64,66 at the time of use.

Figure 6:
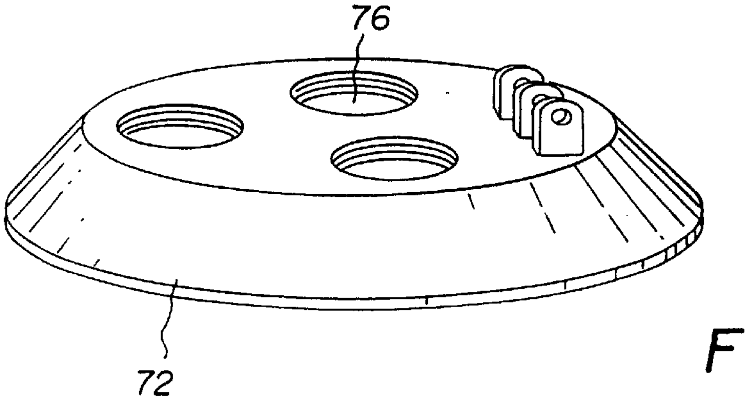
Figure 7:
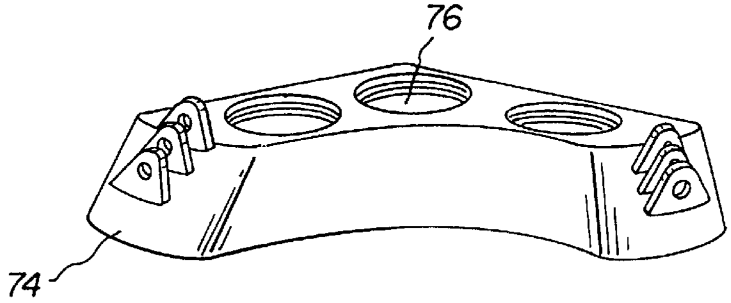

FIGS. 6 and 7, respectively, show table mounted holders 70,72 for holding processing fluid vessels 14,16,18 (FIG. 2) in cups 74.

The various components of the processing kit, that is, the photographic element(s), developing and fixing compositions, processing apparatus, and wash solution, can be packaged in any suitable manner, along with instructions, fluid metering devices or any other optional components that may be desirable. The fluid or solid compositions can be packaged in glass or plastic bottles. The photographic elements are typically packaged as ready-to-use film samples, such as dental packets or "chips".

Development/fixing is preferably, but not essentially, followed by a suitable acidic washing step to stop development, to remove silver salts dissolved by fixing and excess fixing agents, and to reduce swelling in the element. The wash solution can be water, but preferably it is acidic, that is the pH is from about 4.5 to about 7, as provided by a suitable chemical acid or buffer. Generally, this step is not carried out in the processing apparatus unless the films are to be kept for archival purposes or agitation is needed during washing.

After washing, the processed elements may be dried for suitable times and temperatures, but in some instances the black-and-white image may be viewed in a wet condition.

Processing times and conditions for the invention are listed in the following Table II. The total time for the entire processing method can be as low as 35 seconds, and preferably as low as 50 seconds, and as high as 90 seconds, and preferably, as high as 75 seconds.

TABLE II

| PROCESSING STEP | TEMPERATURE (° C.) | TIME (sec) |
|---|---|---|
| Development (first stage) | 15–30 | 5–20 |
| Development/fixing (second stage) | 15–30 | 10–40 |
| Washing | 15–30 | 5–30 |

The following example is provided for illustrative purposes, and not to be limiting in any manner.

Materials and Methods for Examples

Radiographic Film A was prepared having the following layer arrangement and composition:

| | | |
|---|---|---|
| Overcoat Layer | Gelatin | 1.35 g/m$^2$ |
| | Dye I* | 0.48 g/m$^2$ |
| | Dye II** | 0.16 g/m$^2$ |
| Emulsion Layer | AgBr Emulsion (tabular grains 1.3 $\mu$m by 0.13 $\mu$m) | 7.56 g Ag/m$^2$ |
| | Gelatin | 4.92 g/m$^2$ |
| | Dye I* | 0.16 g/m$^2$ |
| | Dye II** | 0.11 g/m$^2$ |
| | 6-chloro-4-nitrobenzotriazole | 2.1 mg/m$^2$ |
| Support | Polyethylene terephthalate | |
| Emulsion Layer | AgBr Emulsion (tabular grains 1.3 $\mu$m by 0.13 $\mu$m, average | 7.56 g Ag/m$^2$ |
| | Gelatin | 4.92 g/m$^2$ |
| | Dye I* | 0.16 g/m$^2$ |
| | Dye II** | 0.11 g/m$^2$ |
| | 6-chloro-4-nitrobenzotriazole | 2.1 mg/m$^2$ |
| Overcoat Layer | Gelatin | 1.35 g/m$^2$ |
| | Dye I* | 0.48 g/m$^2$ |
| | Dye II** | 0.16 g/m$^2$ |

Dye I* is bis [1-(4-carboxyphenyl)-3-methyl-2-pyrazolin-5-one-4] monomethineoxonol.
Dye II* is 4-(4-dimethylaminobenzylidene)-1-(4-carboxyphenyl)-3-methyl-2-pyrazolin-5-one.

Radiographic Film B was like Radiographic Film A except that the silver halide tabular grains were 2.0 $\mu$m by 0.13 $\mu$m (average) in size.

EXAMPLE

The following black-and-white processing compositions I–V in Table III were prepared and used in the methods described below.

Compositions I and IV were solely developing compositions, Composition II was solely-a fixing composition, and Compositions III and V were combined developing/fixing compositions.

TABLE III

| COMPONENT | I(mmol/l) | II(mmol/l) | III(mmol/l) | IV(mmol/l) | V(mmol/l) |
|---|---|---|---|---|---|
| Sodium sulfite | 510 | 150 | 400 | 530 | 270 |
| Benzotriazole | 0 | 0 | 1.6 | 0 | 0 |
| 4-Hydroxymethyl-4-methyl-1-phenyl-3-pyrazolidone | 0.48 | 0 | 1.2 | 0.48 | 0.24 |
| Hydroquinone | 360 | 0 | 230 | 360 | 180 |
| 5-Methylbenzotriazole | 450 | 0 | 0 | 450 | 220 |
| Sodium thiocyanate | 0 | 4070 | 920 | 0 | 2000 |
| Sodium thiosulfate | 0 | 720 | 470 | 0 | 380 |
| pH | 12.3 | 5.2 | 11.0 | 121.3 | 11.8 |

Radiographic films A–C described above exposed to roomlight (500 Lux fluorescent lighting) for 60 seconds, and hand processed using the various processing compositions noted above at room temperature and in roomlight using the following processing protocol. The washing solution was an aqueous solution buffered to a pH of about 4.5. Processing was carried out in a fluid- and light-tight beaker completely shielded from light with black tape. A black hose was inserted into the beaker in a manner so as to prevent exposure of the film and solution to light. This hose was used to introduce the fixing composition at the appropriate time.

The films were then evaluated for various sensitometric properties using conventional sensitometry. The processing protocol and results are shown in the following Table IV.

TABLE IV

| FILM | COMPOSITIONS | DEVELOPMENT TIME (1st Stage, seconds) | FIXING TIME (seconds) | 2nd STAGE (seconds) | SPEED | DYNAMIC RANGE |
|---|---|---|---|---|---|---|
| A | I and II | 20 | 40 | 0 | 227 | 2.46 |
| A | III | 0 | 0 | 60 | 200 | 1.32 |
| A | IV and V | 20 | 0 | 40 | 243 | 3.24 |
| B | I and II | 20 | 40 | 0 | 249 | 3.21 |
| B | III | 0 | 0 | 60 | 159 | 0.55 |
| B | IV and V | 20 | 0 | 40 | 241 | 3.30 |

"Speed" and "Dynamic Range" have conventional meanings. The results in Table IV indicate that it is possible to rapidly process radiographic films under roomlight conditions in a simple two-stage process (using Compositions IV and V). The sensitometric results are comparable to the conventional methods using separate two steps of development and fixing (using Compositions I and II). Moreover the invention provided an improvement in speed and dynamic range over the use of a conventional "monobath" solution (Composition III).

The invention has been described in detail with particular reference to preferred embodiments thereof, but it will be understood that variations and modifications can be effected within the spirit and scope of the invention.

| PARTS LIST | |
|---|---|
| 10 | processing kit |
| 12 | hand-held container |
| 14 | first vessel |
| 16 | second vessel |
| 18 | third vessel |
| 20,22,24 | manually actuated dispensers |
| 26 | inlet |
| 27 | hollow body |
| 28 | removable member |
| 30 | holder |
| 32 | pliable cap |
| 34 | plug |
| 36 | stand |
| 40,42,44 | resilient vessels |
| 46,48,50 | dispensing nozzles |
| 52,54,56 | valves |
| 60 | package |
| 62,64,66 | vessels |
| 68 | brackets |
| 70 | dispensers |
| 72,74 | table mounted holders |
| 76 | cups |

What is claimed is:

1. A processing kit comprising:

a black-and-white photographic silver halide element comprising a support having thereon one or more layers, at least one of said layers being silver halide emulsion layer;

said element further comprising:

in one of said layers, a microcrystalline particulate dye that absorbs electromagnetic radiation in the visible and UV portions of the spectrum and is decolorized upon contact with a fixing agent other than a sulfite; and in each silver halide emulsion layer, a desensitizer that reduces sensitivity of the silver halide emulsion layer to electromagnetic radiation in the visible portion of the spectrum by trapping electrons generated by exposure to that electromagnetic radiation;

a first vessel containing a black-and-white developing composition comprising of about 0.1 to about 0.5 mol/l of a black-and-white developing agent; and from about 0.25 to about 0.7 mol/l of sulfite, and having a first manually actuated dispenser for dispensing said developing composition;

a second vessel containing a fixing composition composition comprising from about 0.5 to about 2 mol/l of a fixing agent other than a sulfite and having a second manually actuated dispenser for dispensing said fixing composition; and a container including a holder for holding at least one of said photographic elements after exposure and further including an inlet through which said first and second dispensers dispense developing and fixing compositions into contact with said exposed element to develop and fix said element;

wherein said first and second dispensers dispense fluid from the top of said vessels and including packaging for holding said first and second vessels in close proximity to each other to facilitate dispensing of said processing fluids.

2. The kit of claim 1 wherein said developing composition is in liquid form and has a pH of from about 10 to about 12.5.

3. The kit of claim 1 wherein said developing composition comprises from about 0.25 to about 0.4 mol/l of said black-and-white developing agent.

4. The kit of claim 1 wherein said fixing composition comprises from about 1 to about 1.5 mol/l of said fixing agent which is a thiosulfate, mercapto-substituted compound, thiocyanate, amine, or mixture thereof.

5. The kit of claim 4 wherein said fixing agent is a thiosulfate, thiocyanate, or a mixture thereof.

6. The kit of claim 1 wherein said developing composition comprises from about 0.4 to about 0.6 mol/l of a sulfite.

7. The kit of claim 1 wherein said developing composition further comprises from about 2 to about 40 mmol/l of a co-developing agent.

8. The kit of claim 1 wherein said developing composition further comprises from about 0.1 to about 1 mmol/l of an antifoggant.

9. The kit of claim 1 wherein said photographic element is a radiographic element having a film support and a silver halide emulsion layer on both sides of said support.

10. The kit of claim 1 wherein said particulate dye is a nonionic polymethine dye.

11. The kit of claim 1 wherein said particulate dye is present in said element in an amount of from about 0.5 to about 2 $g/m^2$.

12. The kit of claim 1 wherein said desensitizer is an azomethine dye.

13. The-kit of claim 1 wherein said desensitizer is present in said element in an amount of from about 1.5 to about 4 $mg/m^2$.

14. The kit of claim 1 wherein said element comprises on each side of said support, a silver halide emulsion layer comprising forehardened silver halide tabular grains comprising at least 85 mol % silver bromide.

15. The kit of claim 1 further comprising a wash solution having a pH of 7 or less.

16. The kit of claim 1 wherein said element further comprises an overcoat layer on both sides of said support, and said particulate dye is located in at least one of said overcoat layers.

17. The kit of claim 16 wherein said particulate dye is located in both of said overcoat layers, and said desensitizer is located in each of said silver halide emulsion layers.

18. The kit of claim 1 wherein said black-and-white developing agent is hydroquinone or ascorbic acid, said developing composition further comprises potassium or sodium sulfite, 4-hydroxymethyl-4-methyl-1-phenyl-3-pyrazolidone as a co-developing agent, and benzotriazole as an antifoggant, and said fixing composition comprises a mixture of sodium thiocyanate and sodium thiosulfate as fixing agents.

19. The kit of claim 1 wherein said fixing composition is in liquid form and has a pH of from about 6 to about 9.

20. The processing kit of claim 1 including a third vessel containing washing fluid having a third manually actuated dispenser for dispensing washing fluid through said inlet into said container.

21. A processing kit comprising:

a container including a holder for removable holding at least one exposed photographic element in said container and further including an inlet through which fluids are dispensed into said container; a first vessel containing developer fluid, having a first manually actuated dispenser for dispensing developer fluid through said inlet into said container; and a second vessel containing fixer fluid, having a second manually actuated dispenser for dispensing fixer fluid through said inlet into said container;

wherein said first and second dispensers dispense fluids from the tops of said vessels; and including packaging for holding said first and second vessels in close proximity to each other to facilitate dispensing of said processing fluids.

22. The processing kit of claim 21 including a third vessel containing washing fluid having a third manually actuated dispenser for dispensing washing fluid through said inlet into said container.

23. The processing kit of claim 21 wherein said holder is removable from said container and wherein said holder includes a cap for sealing off said container.

24. The processing kit of claim 21 wherein said holder is removable from said container and wherein said holder includes a cap for sealing off said container.

* * * * *